United States Patent Office 3,284,204
Patented Nov. 8, 1966

3,284,204
PHOTOGRAPHIC FILMS AND PROCESS OF MAKING SAME
Heinrich von Lillin, Neu Isenburg, Germany, assignor to E. I. du Pont de Nemours and Company, Wilmington, Del., a corporation of Delaware
No Drawing. Filed Feb. 5, 1964, Ser. No. 342,824
Claims priority, application Germany, Mar. 6, 1963, A 42,521
12 Claims. (Cl. 96—87)

This invention relates to photographic films having an improved substratum and to a process and composition for forming the substratum.

It is known in the art that film bases for photographic emulsions must be provided with a substratum before applying the photosensitive layer, in order to provide adhesive union between the hydrophobic film base and the hydrophilic emulsion, usually a gelatino-silver halide emulsion. This adhesion must be adequate both in the dry state, i.e., before and after developing, and also in the wet state, i.e., in photographic baths. So-called dry adhesion is primarily a matter of adequately anchoring a hydrophilic substratum or coating to the hydrophobic base, and is usually effected by use of a suitable solvent or of a solvent blend. On the other hand, in wet adhesion a predominating factor is the presence of suitable chemical groups and linkages, which provide the requisite adhesion even in the swollen gelatin.

As a rule, in applying the anchoring substratum, aqueous solutions consisting of water, gelatin, an organic acid and organic solvents are employed. After drying of the substratum, the latter provides adhesive union with the photosensitive emulsion. It is known to those skilled in the art that when such a getalin substratum is used it is essential to good wet adhesion to add certain substances to the substrate solution, substances which will form intermediate compounds with the active groups of the gelatin and form cross-links. For this purpose, it is usual to employ aldehydes or aldehyde derivatives, e.g., formaldehyde, glyoxal, dimethylolurea, acrolein or the like. All of the cited compounds, however, have the serious disadvantage that they have highly unfavorable effects on the photosensitive emulsion, especially during storage. Thus, a completely uncontrollable after-hardening of the film often occurs, usually associated with impairment of the sensitometric properties of the photosensitive substance, particularly with extensive losses in sensitivity and contrast. But more than this, even the adhesion itself is impaired by the after-hardening. Most of all, the wet adhesion is seriously degraded under the influence of these compounds, and in many cases is completely destroyed. Attempts have been made hitherto to avoid this drawback by using other macromolecular substances instead of gelatin as the adhesive agent. However, the use of synthetic polymers in substrate solutions involves serious disadvantages, because the properties of these substances are very sensitive to the conditions of preparation, particularly with respect to degree of polymerization, degree of terminal group branching, etc., so that after all the substrate solutions containing gelatin are usually preferred.

Now it has been found that an adhesive solution can be prepared which contains gelatin and has excellent adhesive effect if there is added to the coating solution a mixture consisting of an alkylene glycol derivative of polymannuronic acid, dialdehyde starch, water and a water-miscible solvent or mixture of solvents. The ratio of the dialdehyde starch to alkylene glycol derivative of polymannuronic acid may suitably be, for example, 2:1, 1:1 or 1:2, or may be in corresponding intermediate ratios, while the proportion by weight of the blend, calculated on the gelatin preparation employed, may vary from about 1.5% to 4.5% and is preferably about 3%.

Suitable alkylene glycol esters of polymannuronic acid have alkylene radicals of 2–5 carbon atoms, including, for example, the ethylene-, trimethylene- and propylene glycol derivatives disclosed in Industrial and Engineering Chemistry, vol. 43, pages 2073 et seq. (1951) and in Weber U.S. Ser. No. 197,267 filed May 24, 1962. These polymeric compounds preferably have about 25 to about 200 recurring units. Especially useful results are obtained if the alkylene radical of alkylene glycol esters is alkylene of 2–3 carbons, i.e., ethylene or propylene. These compounds may be represented by the formula

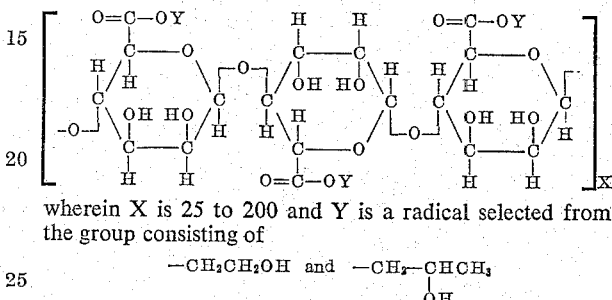

wherein X is 25 to 200 and Y is a radical selected from the group consisting of

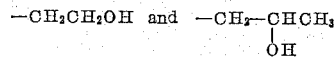

Dialdehyde starch is commercially available in various degrees of oxidation. It is made by the oxidation of starch by means of periodic acid or a periodate salt as disclosed by Grangaard et al. in J. Am. Chem. Soc., vol. 61, pp. 1290–1 (1939) and in U.S. Patents 2,648,629, 2,713,553, 3,057,773 and 3,058,827 and the dialdehyde starches disclosed therein are useful in accordance with this invention. It is also named oxystarch and has two aldehyde groups formed from secondary alcohol groups of anhydroglucose units.

The action of the additives employed in accordance with this invention, in enhancing the adhesive properties of the substratum, is entirely novel and unexpected and was by no means obvious to those skilled in the art. Although it is known from German Patent 1,073,305 and German patent application A 37,539 IVb/39b and assignee's corresponding U.S. application Weber S.N. 197,- 267 filed May 24, 1962 that both dialdehyde starch and the alkylene glycol derivatives of polymannuronic acid are effective hardening agents, the adhesive properties of a gelatin substratum coating solution cannot be improved by adding thereto the cited substances by themselves. For example, if there is applied to a cellulose acetate film base an adhesive layer having the composition, by weight:

| | Percent |
|---|---|
| Gelatin | 0.5 |
| Water | 8.5 |
| Glacial acetic acid | 0.6 |
| Aldehyde starch | 0.01 |
| Acetone | 45.0 |
| Methylene chloride | 10.0 |
| Ethene | 6.0 |
| Methanol | 16.4 |
| Alcohol | 13.0 | and after drying the base is coated with a photosensitive silver halide emulsion, then it is found that the wet adhesion of the material in photographic baths is unsatisfactory. For example, the emulsion can be stripped from the base in these baths by a slight pressure. The same result is obtained when the propylene glycol derivative of polymannuronic acid is used in similar amount instead of dialdehyde starch. Neither can the adhesive effect be improved by increasing the concentration of the individual substances, since the stability of the substratum coating solution then falls off rapidly. An outstanding adhesive effect, as disclosed, is obtained by using a combination of the two ingredients in accordance with this invention.

The adhesive substrata obtained with these novel substratum coating solutions are characterised by excellent adhesion between the hydrophobic film base and the photographic silver halide emulsion, and in particular it is not unfavorably affected in photographic baths but is fully retained therein.

Moreover, in proceeding in the sense of this invention, the sensitometric properties of the photosensitive layer are not impaired, even during prolonged storage, and no after-hardening occurs with its familiar disadvantages (e.g., increased melting point and the like).

The adhesive layers according to this invention can be applied by the customary methods to the cellulose ester film bases known in the art, and after drying they can be provided with the photosensitive layer or layers.

The excellent adherence is obtained with various kinds of film base made from hydrophobic polymeric compounds or resins, including cellulose derivatives, e.g., cellulose acetate, cellulose acetate propionate, cellulose acetate butyrate; polycarbonates, polystyrene, polyvinyl chloride copolymers and polyesters including the polymethylene terephthalates disclosed in Whinfield et al. 2,465,319; the polyethylene terephthalate/isophthalates of British specification 766,290, and those obtained by condensing terephthalic acid or dimethyl terephthalate with diethylene glycol, propylene glycol tetramethylene glycol or cyclohexane-1,4-dimethanol; and the foregoing film bases having a thin coating of a hydrophobic copolymer, especially a vinylidene chloride copolymer as described in Alles et al. U.S.P. 2,627,088 and Alles U.S.P. 2,779,684.

The invention may be more exactly explained by the following examples:

*Example 1*

To a cellulose acetate film base there is applied an aqueous coating solution having the following composition:

| | Percent |
|---|---|
| Gelatin | 0.66 |
| Water | 7.5 |
| Glacial acetic acid | 0.64 |
| Polypropylene glycol derivative of polymannuronic acid | 0.007 |
| Dialdehyde starch | 0.014 |
| Methanol | 32.48 |
| Acetone | 58.70 |

After the substratum is dried, it is coated with a high-sensitivity gelatino-silver iodobromide emulsion and the resulting layer is dried. Adhesion is excellent both in the dry state and also in the conventional photographic developing and fixing baths. Even after 3 months of storage the sensitivity of the silver halide emulsions has not decreased.

*Example 2*

To a cellulose acetate film base there is applied an aqueous subbing solution having the following composition:

| | Percent |
|---|---|
| Gelatin | 0.4 |
| Water | 6.5 |
| Glacial acetic acid | 0.4 |
| Propylene glycol derivative of polymannuronic acid | 0.02 |
| Aldehyde starch | 0.01 |
| Acetone | 49.67 |
| Methylene chloride | 12.0 |
| Methanol | 17.5 |
| Ethanol | 13.5 |

After the substratum is dried, the film base is coated with a gelatino-silver iodobromide emulsion. Adhesion is excellent both in the dry state and also in the photographic baths. Even after 3 months of storage the sensitivity of the silver halide emulsion has not decreased.

*Example 3*

Onto a cellulose acetate/butyrate film base there is applied an aqueous subbing solution having the following composition:

| | Percent |
|---|---|
| Gelatin | 0.9 |
| Water | 4.5 |
| Glacial acetic acid | 1.2 |
| Propylene glycol derivative of polymannuronic acid | 0.015 |
| Aldehyde starch | 0.015 |
| Acetone | 52.52 |
| Methanol | 35.45 |
| Butyrolactone | 4.4 |

After the substratum is dried, it is coated with a gelatino-silver chlorobromide emulsion. Adhesion of the emulsion and substratum is excellent both in the dry state and also in the photographic baths. Even after 3 months of storage the sensitivity of the silver halide has not decreased.

*Example 4*

Onto the vinylidene chloride/methyl acrylate/itaconic acid (90–10–2 parts by weight) layer on a biaxially oriented ethylene terephthalate film base as disclosed in Example IV of Alles U.S. Patent 2,627,088, there is applied a subbing solution of the following composition.

| | Percent |
|---|---|
| Gelatin | 0.66 |
| Water | 7.5 |
| Glacial acetic acid | 0.64 |
| Dialdehyde starch (75% degree of oxidation) | 0.014 |
| Propylene glycol alginate (viscosity of 1% water solution 120 centipoises) | 0.007 |
| Acetone | 58.70 |
| Methanol | 32.48 |

In making the subbing solution, the gelatin, water and acetic acid were allowed to stand at room temperature for ½ hour. It was then steam heated and the dialdehyde starch and propylene glycol alginate were added to the hot solution. This mixture was then added to a solution of the organic solvents. An opaque solution resulted. It was also noted that a very small amount of precipitate formed. After coating, the substratum was first dried at room temperature and subsequently heated for 2 minutes at 100° C. A lithographic aqueous gelatino-silver bromide/chloride dispersion comprising 30 mole percent silver bromide and 70 mole percent silver chloride was coated onto the substratum and then dried. The substratum showed excellent dry and wet adherence when tested by the pressure-sensitive tape application method described in Cohen et al. U.S.P. 3,035,915, May 22, 1962. Similar tests were used according to the previous examples.

This invention has the advantage that it is simple, utilizes readily available, economical materials and produces substrata that have strong adherence to a hydrophobic film base and to a water-permeable colloid layer, e.g., a gelatino-silver halide layer coated thereon. Still other advantages will be apparent to those skilled in the art.

I claim:
1. A photographic element comprising, in order,
   (a) a hydrophobic polymer film base,
   (b) a substratum comprising a mixture of gelatin, dialdehyde starch and an alkylene glycol ester of polymannuronic acid, said alkylene group containing 2–5 carbon atoms, and
   (c) a water-permeable marcromolecular colloid layer on said substratum.

2. A photographic element comprising, in order,
(a) a hydrophobic macromolecular polymer film base,
(b) a substratum comprising a mixture of gelatin, dialdehyde starch and an alkylene glycol ester of polymannuronic acid, said alkylene group containing 2–5 carbon atoms, and
(c) a gelatin layer.

3. An element according to claim 2 wherein said gelatin layer has dispersed therethrough light-sensitive silver halide.

4. An element according to claim 2 wherein said hydrophobic polymer is a polyester.

5. An element according to claim 2 wherein said hydrophobic polymer is polyethylene terephthalate.

6. An element according to claim 2 wherein said hydrophobic polymer is cellulose acetate.

7. An element according to claim 2 wherein the ratio of dialdehyde starch to alkylene glycol ester ranges from 2:1 to 1:2.

8. An element according to claim 2 wherein said alkylene glycol ester is an ethylene glycol ester and there are 25 to 200 recurring units.

9. An element according to claim 2 wherein said alkylene glycol ester is propylene glycol and the ester contains 25 to 200 recurring units.

10. A process for making a photographic film element which comprises applying to the surface of a hydrophobic polymer film base a substratum from an aqueous solution comprising a mixture of a water-miscible, volatile solvent gelatin, dialdehyde starch and an alkylene glycol ester of polymannuronic acid, said alkylene group containing 2–5 carbon atoms, drying said substratum and applying to the dried layer an aqueous solution containing a water-permeable, macromolecular organic colloid and drying the resulting layer.

11. A process for making a photographic film element which comprises applying to the surface of a hydrophobic polymer film base a substratum from an aqueous solution comprising a mixture of a water-miscible, volatile solvent, gelatin, dialdehyde starch and an alkylene glycol ester of polymannuronic acid, said alkylene group containing 2–5 carbon atoms, drying said substratum and applying to said substratum an aqueous gelatin solution.

12. A process according to claim 11 wherein said gelatin solution contains light-sensitive silver halide.

No references cited.

NORMAN G. TORCHIN, *Primary Examiner.*

R. H. SMITH, *Assistant Examiner.*